UNITED STATES PATENT OFFICE.

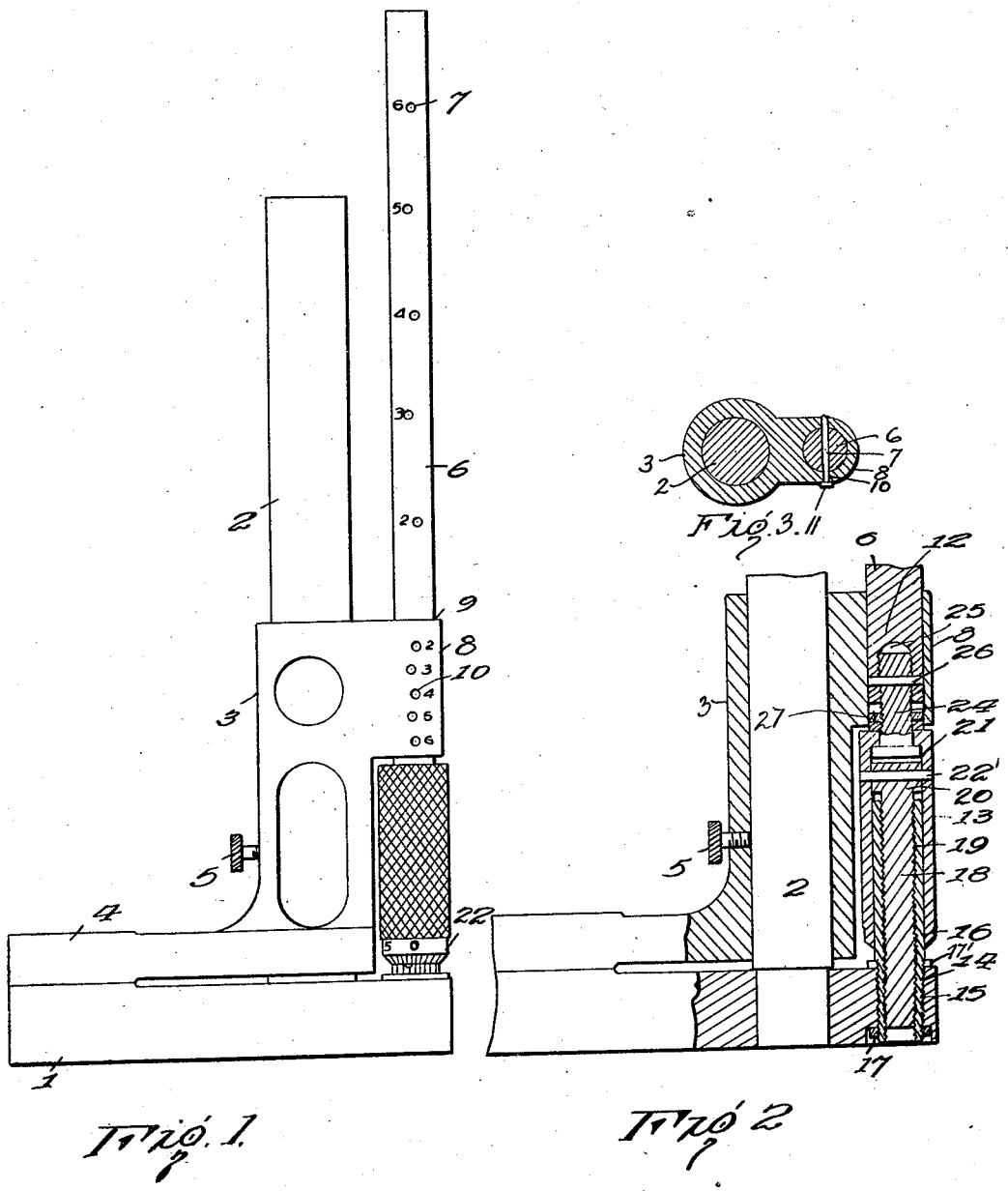

VICTOR L. CROSS, OF DETROIT, MICHIGAN.

MICROMETER HEIGHT GAUGE.

1,414,183.　　　Specification of Letters Patent.　Patented Apr. 25, 1922.

Application filed January 11, 1918. Serial No. 211,359.

*To all whom it may concern:*

Be it known that I, VICTOR L. CROSS, a citizen of the United States, residing at Detroit, in the county of Wayne and State of Michigan, have invented certain new and useful Improvements in Micrometer Height Gauges, of which the following is a specification.

This invention relates to new and useful improvements in measuring devices, and more particularly to gauges whereby a device of this character is provided with means for accurately and minutely adjusting the movable jaw of the gauge so as to expedite accurate measurement.

Another object of the invention is to provide a gauge of this character, which is provided with the usual type of movable jaw, which is adjustable toward and from a stationary base, and said jaw is provided with means for adjusting the same slightly after it has been fixed at certain predetermined positions, said means including a supplemental gauge so that the accurate measurement to the fraction of an inch may be easily determined.

A further object of the invention is to provide a height measuring gauge of this character, with a micrometer attachment, that is operatively associated therewith and which permits a frictional adjustment between a predetermined scale of the gauge and which is provided with a supplemental gauge on the micrometer.

A still further object of the invention is to provide a device of this character which is easily and simply constructed, inexpensive to manufacture, and one which will be very efficient in operation.

With these and numerous other objects in view, my invention consists in the novel features of construction, combination and arrangement of parts which will be herein referred to and more particularly pointed out in the specification and claims.

In the accompanying drawings:—

Figure 1 is a side elevation of the improved device.

Figure 2 is a vertical longitudinal section through a portion of the same, and

Figure 3 is a fragmentary sectional view taken through the movable guide rod, and the movable jaw showing in detail the securing of said movable jaw in its adjusted position on the guide rod.

In describing my invention I shall refer to the drawings in which similar reference characters designate corresponding parts throughout the several views. The numeral 1 designates the stationary base of my new and improved gauge, which is of the usual type, and which has rising therefrom at a point intermediate its ends, a stationary guide rod 2. Slidably mounted upon the guide rod 2, is the usual type of movable jaw 3, provided with a projecting jaw portion 4, which is movable toward and from the stationary base 1, in a manner to be hereinafter more fully described. The movable jaw 3, is adapted to be locked at various positions on the guide rod 2, by means of a set screw 5, as clearly shown in Figure 1 of the drawings.

Arranged parallel with the rod 2 is a vertically movable rod 6, which has a plurality of openings 7 therein, the same being arranged in staggered relation to each other and located at predetermined intervals apart, while adjacent to these openings are suitable numbers consecutively arranged for a purpose presently described. The rod 6, in its parallel relation with the guide rod 2, has slidable thereon the movable jaw 3, provided at its upper end portion with an extension 8 provided with an opening 9, so as to constitute a hub for embracing the rod 6, which extends through the said opening 9 as is clearly shown in Figure 2 of the drawings. This extension or hub 8 is integral with the jaw 3 and slides upon the rod 6 when the said jaw 3 is raised or lowered relative to the base 1 when making a wide range of adjustment of the implement. The extension or hub 8 of the jaw 3 has provided therein a plurality of spaced openings 10 disposed in staggered relation to each other so that certain of the openings 7 will register with certain of the openings 10 on the adjustment of the jaw upon the rod 6, these openings 10 being designated by suitable numerals marked upon the extension or hub 8 and arranged in consecutive order for the registration of said openings 10 with the selected openings 7, whereby said adjustments may be had on a wide range scale of the jaw 3 relative to the base 1. A locking pin 11 is adapted to be engaged through selected openings 7 and 10 in the rod 6 and extension or hub 8 for the securing of the jaw 3 in fixed adjusted position on the said rod 6.

The lower end 12 of the movable rod 6, is connected by a micrometer attachment 13, with the base 1, which attachment is carried by a stationary sleeve 16 rising from the inner end of the base for the purpose. For securing the sleeve 16 in position, the same has its lower end threaded, as at 15, through a complementally threaded opening 14 formed immediately inward of the inner end at the base 1, after a lock nut 17' has been threaded upwardly of the lower end of the sleeve 16, which lock nut will abut the upper face of the base 1, when properly positioned, and the lower end of the sleeve 16 will terminate in the plane of the lower face of the base 1, which is formed to provide a countersink concentric to the sleeve 16, whereby to admit of the threading thereon of a second lock nut 17, which, when tightened inwardly of the countersink, acts in conjunction with the upper lock nut 17' to retain the sleeve 16 rigidly in position.

Mounted within the sleeve 16 is a screw 18 which is in engagement with screw threads 19 internally of the sleeve 16 carried by the base 1. The headed portion of the screw 18 projects above the upper edge of the sleeve 16, and surrounding the upper portion of said sleeve and the headed portion 20 is a micrometer barrel 21 which has its outer surface roughened, while the lower edge is provided with a scale 22 thereon to coact with a suitable indicator mark upon the base adjacent to the lower edge of the barrel 21 for permitting accurate minute adjustment of the jaw 3 in the use of the implement.

The head 20 of the screw 18, is securely connected with the barrel 21, by a locking pin 22', which projects therethrough, and hence upon rotation of the barrel, the screw will be correspondingly rotated. Swivelled within the upper end of the barrel is the head portion of a screw 24, which has its shank projecting upwardly from the barrel, and its extremity disposed in a recess 25 in the lower end of the rod. This extremity is securely held within the recess in the rod by a cross pin 26. This connection forms a swivel between the barrel and the rod 6, and hence the rod 6 is movable longitudinally toward and from the stationary base 1. Lock nuts 27 are provided on the screw 24 to take up lost motion in the swivel. These lock nuts 17 rest closely on the upper end of the sleeve 13, with the lower lock nut contacting the sleeve for such purpose.

In operation, the gauge is adjusted to the article, in the usual manner, by sliding the movable jaw on the guide rod 2, and the extension 8 thereof being likewise moved on the rod 6. The movable jaw is locked in the nearest practical position corresponding to the dimension of the article to be measured, by inserting the locking pin 11 through the aligning openings in the extension 8 and rod 6, which are nearest to the desired adjustment. This will lock the jaw, at an easily determined number of inches from the stationary jaw. When the movable jaw is locked in this first position, the fractional inch adjustment is obtained by rotating the micrometer, that is the barrel 21 which will adjust the jaw by moving the rod 6 longitudinally. This will bring the jaw in contact with the object and by means of the scale 22 on the lower edge of the barrel 21, the fractional adjustment to a very fine degree may be easily ascertained. When the micrometer attachment, and gauge are adjusted to the desired position, the attachment may be locked, through the operation of the set screw 5.

From the foregoing description, taken in connection with the accompanying drawing, it is thought that a clear and comprehensive understanding of the construction, operation, and advantages of my invention may be had, and while I have shown and described the device as embodying a specific structure, I desire that it be understood that such changes may be made in said construction as do not depart from the spirit and scope of the invention as claimed.

Having thus fully described the invention, what is claimed is:—

1. A gauge of the character described, comprising a base, a guide rod rising from said base, a jaw slidable on the rod, a movable guide rod arranged in spaced parallel relation to the first named guide rod, means for locking the slidable jaw upon the movable guide rod, an adjusting sleeve connected with the base for vertical adjustment, a swivelled connection between the movable guide rod and said sleeve, and means for locking the slidable jaw with the first named guide rod.

2. A gauge of the character described, comprising a base, a guide rod rising from said base, a jaw slidable on the rod, a movable guide rod arranged in spaced parallel relation to the movable guide rod, means for locking the slidable jaw upon the first named guide rod, an adjusting sleeve connected with the base for vertical adjustment, a swivelled connection between the movable guide rod and said sleeve, means for taking up lost motion in said swivelled connection, and means for locking the slidable jaw with the movable guide rod.

3. A gauge of the character described, comprising a base, a guide rod rising from said base, a jaw element slidable on said guide rod, a tubular portion formed with said jaw element at one side of the upper end thereof, means for locking said jaw element in adjusted position on said guide rod, a movable guide rod passing through the tubular portion of said jaw element, an adjusting sleeve rising from said base in line with said movable guide rod, a swivelled connection between said movable guide rod and said adjusting sleeve, and means for locking said jaw element with said movable guide rod.

4. A gauge of the character described, comprising a base, a stationary guide rod rising from said base, a jaw element slidable on said guide rod, a tubular portion formed with said jaw element at one side of the upper end thereof, means for locking said jaw element in adjusted position on said guide rod, a movable guide rod passing through the tubular portion of said jaw element, an adjusting sleeve rising from said base in line with said movable guide rod, a swivelled connection between said movable guide rod and said adjusting sleeve, means for taking up lost motion in said swivelled connection, and means for locking said jaw element with said movable guide rod.

5. A gauge of the character described, comprising a base, a stationary guide rod rising from said base, a jaw element slidable on said guide rod, a tubular portion formed with said jaw element at one side of the upper end thereof, means for locking said jaw element in adjusted position on said guide rod, a movable guide rod passing through the tubular portion of said jaw element, an adjusting sleeve rising from said base in line with said movable guide rod, a swivelled connection between said movable guide rod and said adjusting sleeve, a lock nut for taking up the lost motion in said swivelled connection, and means for locking said jaw element with said movable guide rod.

6. A gauge of the character described, comprising a base, a stationary guide rod rising from said base, a jaw element slidable on said guide rod, a tubular portion formed with said jaw element at one side of the upper end thereof, means for locking said jaw element in adjusted position on said guide rod, a movable guide rod passing through the tubular portion of said jaw element, an adjusting sleeve rising from said base in line with said movable guide rod, a swivelled connection between said movable guide rod and said adjusting sleeve, lock nuts for taking up lost motion in said swivelled connection, and a lock pin insertable in registering openings formed in said tubular portion of said jaw element and said movable guide rod for connecting the same together in adjusted position.

In testimony whereof, I affix my signature hereto.

VICTOR L. CROSS.